Nov. 23, 1943.   C. V. WALKER   2,334,971
FILTER
Filed Feb. 21, 1941
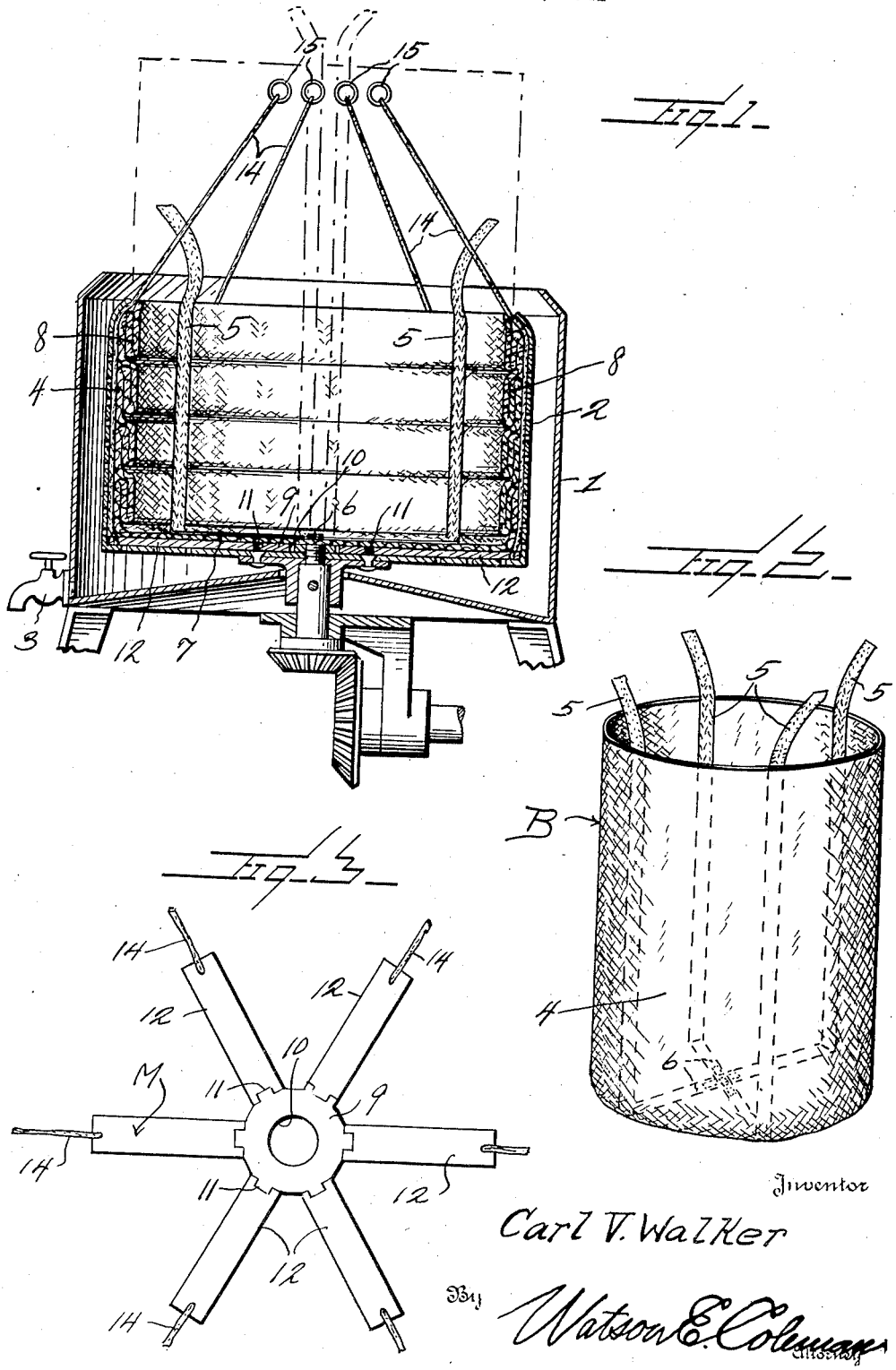
Inventor
Carl V. Walker
By Watson E. Coleman Patented Nov. 23, 1943

2,334,971

UNITED STATES PATENT OFFICE 2,334,971

FILTER

Carl V. Walker, Camden, S. C.

Application February 21, 1941, Serial No. 380,051

5 Claims. (Cl. 210—76)

This invention relates to a filter for liquid separation and it is a particular object of the invention to provide a filter of this kind which is particularly adapted for use in reclaiming cleansing fluid from the sludge taken from a pressure filter such as used in a dry cleaning establishment.

It is a further particular object of the invention to provide a filter of suitable flexible material of a bag-like structure for placement within the basket of a centrifugal extractor, said bag being so constructed to provide means whereby the liquid separating matter which cakes upon the filter, during the filtering operation, may be readily broken up to facilitate the removal of the bag and its separated matter from within the basket of the extracting machine.

The invention also has for an object to provide means to be placed within the basket of the extractor for co-action with the bag to break up the caked sediment within the bag to facilitate the removal of the bag from within the basket after the completion of an extracting operation.

In order that my invention may be the better understood, I will now proceed to describe the same with reference to the accompanying drawing, wherein Figure 1 is a view, partly in vertical section and partly in elevation, illustrating a filter constructed in accordance with an embodiment of my invention and in applied position within the basket of an extractor, said figure being also somewhat diagrammatic and the extended or lengthened position of the bag being indicated by broken lines;

Figure 2 is a view in perspective of the filter bag unapplied; and

Figure 3 is a view in plan of the breaker member for coaction with the bag, said member being also unapplied.

As disclosed in the accompanying drawings 1 denotes the stationary casing or container of a centrifugal extractor and in which is mounted the rotatable basket 2 which has approximately 1000 R. P. M. The casing or container 1 and basket 2 form no part of my present invention insofar as the particular construction thereof is concerned. These parts are of the type now generally included in the construction of the extractors employed in dry cleaning. The casing or container 1, at a suitable low point, is provided with a conventional drain cock 3.

After subjecting garments and the like in a dry cleaning establishment to the action of a dry cleaning washer where the soil, grime, etc., is taken from the clothes and carried away by an absorption filter powder and deposited on the screens of a filter pressure, there results a sludge which contains a high percentage of cleaning fluid. In the present embodiment of my invention I provide a filter bag B of a ducking cloth or other suitable textile material as may be preferred. This bag B is of a length approximately twice the depth of the basket 2 of a centrifugal extractor, but of a transverse diameter closely approximating the internal diameter of the basket 2. Relatively heavy tapes 5 extend within the bag B and have their inserted extremities secured, as at 6, to the central portion of the bottom wall 7 of the bag B. These tapes 5 are of a length to extend across the bottom wall 7 and up along the side wall 4 to extend a desired distance beyond the upper or open face of the bag.

In practice, the side wall 4 of the bag B is formed to provide therealong a series of concentric folds 8, as illustrated in Figure 1, whereby the initial length of the bag B will be shortened sufficient to allow the bag B to be snugly fitted within the basket 2 of the extractor with the folded side wall extending from substantially the bottom of the basket 2 to the top thereof.

Before applying the bag B within the basket 2 it is preferred to place within the basket 2 and upon the bottom thereof a breaking member M. This member M is made of metal or other desired material possessing the desired rigidity and, as illustrated in Figure 3, this member M comprises a central annular member 9, this member 9 defining a central opening 10 to facilitate the proper placement of the member M upon the bottom of the basket 2.

Hingedly connected, as at 11, to the member 9 are the elongated flat arms 12. These arms 12, as herein disclosed, are six in number and are equidistantly spaced around the central member 9. It is believed, however, to be obvious that the number of these arms 12 may be reduced or increased as preferred.

The member 9 is of such diameter and the arms 12 of such lengths as to have the outer ends of the arms 12 in close position to the side wall of the basket 2 of the extractor when the member M is in its normally flattened position upon the bottom of the basket 2.

The outer end portions of each of the arms 12 has suitably secured thereto an end portion of a flexible member 14 of a length to extend a desired distance out through and above the open top of the case or container 1. These members 14, as illustrated in Figure 1, have their outer end portions provided with the ring members 15 or the like whereby the same may be readily engaged with a suitable implement to facilitate upward and simultaneous pull upon all of the arms 12 for a purpose to be later mentioned.

After the bag B has been properly placed within the basket 2 and upon the previously positioned member M, the sludge taken from a pressure filter, as used in a dry cleaning establishment, is poured within the folded bag B inside of the basket 2. The basket 2 is then caused to rotate at required speed so that the liquid within the sludge will be caused to pass through the folded wall of the bag B and out through the perforated wall of the basket 2 into the case or container 1. This liquid will be free of impurities and will be collected within the lower portion of the case or container 1 and drained out in due course through the cock 3. The solid matter separated by the bag and retained therein tightly packs against the folded wall 4 of the bag B during the separating operation.

After the extracting operation has been completed the flexible members or tapes 5 are pulled toward the center of the bag B and thereby breaking loose caked sediment. The bag B is then pulled upwardly out of the basket 2 and as the bag is moving upwardly the loose sediment falls to the bottom of the bag with a resultant sufficient contraction of the diameter of the bag to allow the same to pass out through the open top of the basket 2. This construction of the bag is the result of the unfolding of the bag as it is lifted out of the basket 2.

From the foregoing description it is thought to be obvious that a filter constructed in accordance with my invention is particularly well adapted for use by reason of the convenience and facility with which it may be assembled and operated.

I claim:

1. A filter for dry cleaning fluid taken from pressure filters used in dry cleaning, comprising a rotatable basket, means for rotating the basket at a high speed, the walls of the basket being perforated, a bag snugly located within the basket, said bag being of a length materially greater than the depth of the basket, said bag having folds circumferentially therearound to reduce the length of the bag to substantially the length of the basket.

2. A filter for dry cleaning fluid taken from pressure filters used in dry cleaning, comprising a rotatable basket, means for rotating the basket at a high speed, the walls of the basket being perforated, a bag snugly located within the basket, said bag being of a length materially greater than the depth of the basket, said bag having folds circumferentially therearound to reduce the length of the bag to substantially the length of the basket, and means for lifting the bag and the separated matter therein from within the basket.

3. A filter for dry cleaning fluid taken from pressure filters used in dry cleaning, comprising a rotatable basket, means for rotating the basket at a high speed, the walls of the basket being perforated, a bag snugly located within the basket, said bag being of a length materially greater than the depth of the basket, said bag having folds circumferentially therearound to reduce the length of the bag to substantially the length of the basket, and means for lifting the bag and the separated matter therein from within the basket, said lifting means breaking the caking of the separated matter within the bag against the wall thereof.

4. A filter for dry cleaning fluid taken from pressure filters used in dry cleaning, comprising a rotatable basket, means for rotating the basket at a high speed, the walls of the basket being perforated, a bag snugly located within the basket, said bag being of a length materially greater than the depth of the basket, said bag having folds circumferentially therearound to reduce the length of the bag to substantially the length of the basket, flexible members secured along the side wall and across the bottom wall of the bag, said flexible members being of a length to extend beyond the open end of the bag and outwardly of the basket.

5. A filter for dry cleaning fluid taken from pressure filters used in dry cleaning, comprising a rotatable basket, means for rotating the basket at a high speed, the walls of the basket being perforated, a bag snugly located within the basket, said bag being of a length materially greater than the depth of the basket, said bag having folds circumferentially therearound to reduce the length of the bag to substantially the length of the basket, a breaking member within the basket of an extractor below the bag bottom, said member including a plurality of swinging arms radiating from the center of the member and means for swinging said arms upwardly and inwardly to break separated matter within the bag caked upon the walls thereof.

CARL V. WALKER.